United States Patent [19]

Margotte

[11] 4,188,475

[45] Feb. 12, 1980

[54] PROCESS FOR THE PREPARATION OF FLAME-RETARDANT POLYCARBONATES

[75] Inventor: Dieter Margotte, Krefeld, Fed. Rep. of Germany

[73] Assignee: Bayer Aktiengesellschaft, Leverkusen, Fed. Rep. of Germany

[21] Appl. No.: 920,932

[22] Filed: Jun. 30, 1978

[30] Foreign Application Priority Data

Jul. 19, 1977 [DE] Fed. Rep. of Germany ....... 2732556

[51] Int. Cl.² ............................................. C08G 63/62
[52] U.S. Cl. ............................. 528/175; 260/DIG. 24; 528/128; 528/196; 528/199; 528/202
[58] Field of Search ............... 528/196, 197, 198, 199, 528/314, 175, 171, 128, 202; 260/463, DIG. 24

[56] References Cited

U.S. PATENT DOCUMENTS

| | | | |
|---|---|---|---|
| 3,177,179 | 4/1965 | Lee | 528/196 |
| 3,240,756 | 3/1966 | Deanin et al. | 528/199 |
| 3,398,120 | 8/1968 | Hindersinn et al. | 528/199 |
| 3,933,734 | 1/1976 | Mark | 260/45.7 S |
| 4,020,045 | 4/1977 | Baggett | 260/47 XA |

FOREIGN PATENT DOCUMENTS

1311130 10/1962 France.

OTHER PUBLICATIONS

Chemistry and Physics of Polycarbonates, by H. Schnell Interscience Pub., 1964 (pp. 189–207).
Polycarbonates, by W. M. Christopher and D. Fox, Reinhold Pub. Corp., 1962 (pp. 83–160).

Primary Examiner—Theodore E. Pertilla
Attorney, Agent, or Firm—Gene Harsh; Lawrence S. Pope

[57] ABSTRACT

The present invention relates to the preparation of aromatic polycarbonates, by the two-phase interface process, from diphenols, preferably from halogen-free diphenols, characterized in that aromatic monosulphonic acid chlorides are used as chain stoppers in amounts of about 2 mol % to 20 mol %, preferably in amounts of about 2.5 mol % to 10 mol %, relative to mols of the diphenols employed. In addition, the present invention relates to the aromatic polycarbonates obtainable by the process according to the invention.

8 Claims, No Drawings

PROCESS FOR THE PREPARATION OF FLAME-RETARDANT POLYCARBONATES

SUMMARY OF THE INVENTION

The present invention relates to the preparation of aromatic polycarbonates, by the known two-phase interface process, from diphenols, preferably from halogen-free diphenols, characterized in that aromatic monosulphonic acid chlorides are used as chain stoppers in amounts of about 2 mol % to 20 mol %, preferably in amounts of about 2.5 mol % to 10 mol %, relative to mols of the diphenols employed. In addition, the present invention relates to the aromatic polycarbonates obtainable by the process according to the invention.

DETAILED DESCRIPTION OF THE INVENTION

The polycarbonates according to the invention have an improved flame repellency. Improvements in the flame-retardant properties of aromatic thermoplastic polycarbonates have already been attempted in various ways, and also achieved; however, occasionally disadvantages in other polycarbonate properties had to be accepted with the flame retardant improvement.

According to DT-OS (German Published Specification) No. 1,720,812 and U.S. Pat. No. 3,751,400, it is also possible to use halogenophenols as flameproofing chain stoppers. However, the disadvantage of this approach is that the flameproofing is not sufficient for many application purposes.

In principle, it is possible to use all aromatic monosulphonic acid chlorides for the process according to the invention; thus, for example, unsubstituted and substituted benzenesulphonyl chlorides, unsubstituted and substituted naphthalenesulphonyl chlorides, unsubstituted and substituted anthracenesulphonyl chlorides and unsubstituted and substituted phenanthrenesulphonyl chlorides.

In this connection, alkyl, cycloalkyl, aryl or halogen, for example, are to be understood as substituents.

Benzenesulphonyl chlorides which are suitable according to the invention are those of the formula I

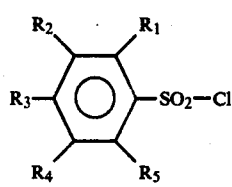

wherein
R₁ to R₅ are identical or different and are H, alkyl, preferably C₁ to C₄, cycloalkyl, preferably C₅ to C₆, aryl, preferably C₆ to C₁₆, or halogen, preferably chlorine or bromine.

Examples of aromatic monosulphonic acid chlorides which are suitable according to the invention are benzenesulphonyl chloride, 2-methylbenzenesulphonyl chloride, 4-methylbenzenesulphonyl chloride, 2,4-dimethylbenzenesulphonyl chloride, 4-ethylbenzenesulphonyl chloride, 2-ethylbenzenesulphonyl chloride, 2-chlorobenzenesulphonyl chloride, 3-chlorobenzenesulphonyl chloride, 4-chlorobenzenesulphonyl chloride, 2,5-dichlorobenzenesulphonyl chloride, 3,4-dichlorobenzenesulphonyl chloride, 2-methyl-5-chlorobenzenesulphonyl chloride, 3-chloro-4-methylbenzenesulphonyl chloride, diphenyl-4'-sulphonyl chloride, 3-methyl-diphenyl-4-sulphonyl chloride, 3,4'-dimethyldiphenyl-4-sulphonyl chloride and 4'-chlorodiphenyl-4-sulphonyl chloride.

The following sulphonic acid chlorides are preferably used: benzenesulphonyl chloride, 4-methylbenzenesulphonyl chloride, 4-chlorobenzenesulphonyl chloride, 3,4-dichlorobenzenesulphonyl chloride, diphenyl-4-sulphonyl chloride and naphthalene-2-sulphonyl chloride.

The aromatic polycarbonates of the present invention can also be characterized by the general structural formula

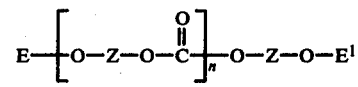

wherein
E and E¹ are the same or different and are radicals of the formula II

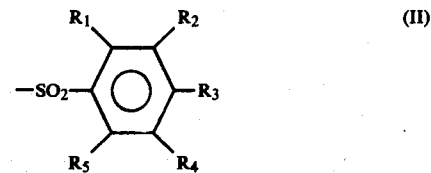

wherein
R₁ to R₅ are identical or different and are H, C₁–C₄-alkyl, C₅–C₆-cycloalkyl, C₆–C₁₆-aryl or halogen, and
wherein
Z represents a divalent aromatic radical derived from a compound of the formula III

and
n is the degree of polymerization which results from a weight average molecular weight, Mw, of the aromatic polycarbonate of from about 10,000 to 100,000.

The preparation of polycarbonates by the phase interface process is known. The polycarbonates are obtained by reacting diphenols, in particular dihydroxydiarylalkanes or -cycloalkanes, with phosgene, those dihydroxydiaryl-alkanes and -cycloalkanes in which the aryl radicals are substituted in the o-position to the phenolic hydroxyl groups also being suitable, in addition to unsubstituted dihydroxydiaryl-alkanes and -cycloalkanes. The polycarbonates prepared by the phase interface process can also be branched in a known manner.

The known catalysts, such as, for example, triethylamine, and the customary solvents, reaction temperatures and amounts of alkali for the two-phase interface process are likewise known such as those taught in the text *Chemistry and Physics of Polycarbonates* by Hermann Schnell, Interscience Publishers, New York, 1964.

The polycarbonates according to the invention may have weight average molecular weights (M_w=weight-average) between about 10,000 and 100,000, preferably between about 20,000 and 80,000, which can be determined from the relative viscosity of the polycarbonates (measured in $CH_2Cl_2$ at 25° C. and at a concentration of about 0.5% by weight).

Examples of suitable diphenols are hydroquinone, resorcinol, 4,4′-dihydroxydiphenyl, bis-(hydroxyphenyl) alkanes, such as, for example, $C_1$–$C_8$-alkylene- and $C_2$–$C_8$-alkylidene-bisphenols, bis-(hydroxyphenyl)-cycloalkanes, such as, for example, $C_5$–$C_6$-cycloalkylene- and $C_5$–$C_6$-cycloalkylidene-bisphenols, and bis-(hydroxyphenyl) sulphides, ethers, ketones, sulphoxides or sulphones. Furthermore, α,α′-bis-(hydroxyphenyl)-diisopropylbenzenes and the corresponding nuclear-alkylated and nuclear-halogenated compounds.

Suitable polycarbonates are, for example, those based on 2,2-bis-(4-hydroxy-phenyl)-propane (bisphenol A), 2,2-bis-(4-hydroxy-3,5-dichloro-phenyl)-propane (tetrachlorobisphenol A), 2,2-bis-(4-hydroxy-3,5-dibromophenyl)-propane (tetrabromobisphenol A), 2,2-bis-(4-hydroxy-3,5-dimethyl-phenyl)-propane (tetramethylbisphenol A), 2,2-bis-(4-hydroxy-3-methyl-phenyl)-propane and 1,1-bis-(4-hydroxy-phenyl)-cyclohexane (bisphenol Z), as well as those based on trinuclear bisphenols, such as α,α′-bis-(4-hydroxy-phenyl) -p-diisopropylbenzene.

Further diphenols suitable for the preparation of polycarbonates are described in U.S. Pat. Nos. 3,028,265, 2,999,835, 3,148,172, 3,271,368, 2,991,273, 3,271,367, 3,280,078, 3,014,891 and 2,999,846, all incorporated herein by reference, and German Offenlegungsschriften (German Published Specifications) Nos. 2,063,050 (LeA 13,359), 2,063,052 (LeA 13,425), 2,211,957 (LeA 14,240) and 2,211,956 (LeA 14,249).

Polycarbonates obtained from halogen-free diphenols are preferred according to the invention.

Compared with the conventional polycarbonates terminated with monofunctional phenols, the flame-retardant polycarbonates according to the invention are distinguished by an improved flame retardancy. Thus, depending on the molecular weight and the content of chain regulator, the polycarbonates according to the invention generally achieve better burning gradings and considerably shorter after-burn times.

EXAMPLES

The following examples are intended to illustrate the subject of the invention in more detail.

I. Comparison examples

1. Polycarbonate with p-tert.-butylphenol as the chain stopper

About 454 parts of 2,2-(4,4′-dihydroxydiphenyl)-propane and 9.5 parts of p-tert.-butylphenol are suspended in 1.5 liters of water. The oxygen is removed from the reaction mixture in a 3-necked flask, provided with a stirrer and gas inlet tube, by passing nitrogen through the reaction mixture for 15 minutes, while stirring. 355 parts of 45% strength sodium hydroxide solution and 1,000 parts of methylene chloride are then added. The mixture is cooled to 25° C. While maintaining this temperature by cooling, 237 parts of phosgene are added over a period of 120 minutes. An additional amount of a 45% strength sodium hydroxide solution of 75 parts is added after 15–30 minutes or after the absorption of phosgene has started.

1.6 parts of triethylamine are added to the solution formed and the mixture is stirred for a further 15 minutes. A highly viscous solution is obtained, the viscosity of which is regulated by adding methylene chloride. The aqueous phase is separated off. The organic phase is washed with water until free from salts and alkali. The polycarbonate is isolated from the washed solution and dried. The polycarbonate has a relative viscosity of 1.30, measured in a 0.5% strength solution of methylene chloride at 25° C. This approximately corresponds to a weight average molecular weight of about 32,000. The polycarbonate, thus, obtained is extruded and granulated.

2. An aromatic polycarbonate based on 97.7 mol % of bisphenol A and 2.3 mol % of 2,2-(4,4′-dihydroxy-3,3′-5,5′-tetrachlorodiphenyl)-propane (tetrachlorobisphenol A) with a relative viscosity $\eta_{rel}$ of 1.33, L $M_{LS}$=34,000, prepared according to Example 1.

3. An example according to DT-OS (German Published Specification) No. 1,720,812:

A polycarbonate obtained from bisphenol A with 3.27 mol % of 1,3,5-tribromophenol as the chain regulator, with a relative viscosity $n_{rel}$ of 1.32, prepared according to Example 1.

II. The polycarbonates according to the invention

4. A solution is prepared from 3.192 kg of 2,2-bis-(4-hydroxyphenyl)-propane (bisphenol A) (14 mols), 2.53 kg of 45% strength aqueous sodium hydroxide solution and 15 liters of distilled water. After adding 34 kg of methylene chloride, 80.8 of benzenesulphonyl chloride (3.27 mol %), dissolved in 1 kg of methylene chloride, are added at room temperature, while stirring. 2.64 kg of phosgene are passed in at 20°–25° C. The pH value is kept at 13–14 during the phosgenation by adding a further 26.3 kg of 6.5% strength sodium hydroxide solution. 15 ml of triethylamine are then added and the mixture is further stirred for 30 minutes. The upper aqueous phase is then separated off and the organic phase is acidified and washed until free from electrolytes. The methylene chloride is then evaporated off and the polycarbonate is dried at 110° C. for 8 hours. The relative viscosity $\eta_{rel}$ is 1.32.

5. A polycarbonate based on bisphenol A, prepared according to Example 4 using 3.4 mol % of 3,4-dichlorobenzenesulphonyl chloride and with a relative viscosity of 1.29.

6. A polycarbonate based on bisphenol A, prepared according to Example 4 using 3.27 mol % of naphthalene-2-sulphonyl chloride and with a relative viscosity of 1.31.

7. A polycarbonate based on bisphenol A with 3.27 mol % of 3,4-dichlorobenzenesulphonyl chloride and with a relative viscosity of 1.30, prepared according to Example 4.

Table

| | Polycarbonate from Example | Burning characteristics according to Underwriters Laboratories Bull. 94, thickness of test rod 1/16″ | After-burn times after the 2nd flaming in seconds |
|---|---|---|---|
| I | 1 Comparison example | V 2 | 24 |
| II | 4 | V 2 | 11 |
| II | 5 | V 1 | 18 |
| II | 6 | V 2 | 12 |
| I | 2 Comparison example | V 2 | 22 |
| II | 7 | V 1 | 16 |
| I | 3 Comparison | | |

Table-continued

| Polycarbonate from Example | Burning characteristics according to Underwriters Laboratories Bull. 94, thickness of test rod 1/16" | After-burn times after the 2nd flaming in seconds |
| --- | --- | --- |
| example | V 2 | 21 |

The burning characteristics according to UL Bull. 94, thickness of test rod 1/16", were determined on tempered test rods (130° C., 2 days).

The after-burn times after the 2nd flaming are determined with a stopwatch; each is the average value of 5 different measurements.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In a process for the preparation of an aromatic polycarbonate from diphenols by a two-phase interface process, the improvement wherein an aromatic monosulphonic acid chloride is used as a chain stopper in an amount of from about 2 mol % to 20 mol %, relative to the number of mols of diphenol.

2. The process according to claim 1 wherein the amount of aromatic monosulphonic acid chloride is from about 2.5 mol % to 10 mol %.

3. The process according to claim 1 wherein the diphenols are halogen free.

4. The process according to claim 1 wherein the aromatic monosulphonic acid chloride has the general formula

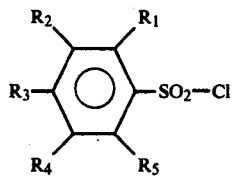

(I)

wherein $R_1$ to $R_5$ are identical or different and are H, alkyl, cycloalkyl, aryl or halogen.

5. The process according to claim 4 wherein the alkyl group has from 1 to 4 carbon atoms, the cycloalkyl group has 5 or 6 carbon atoms, the aryl group has 6 to 16 carbon atoms, and the halogen is chlorine or bromine.

6. The process of claim 1 wherein the aromatic polycarbonate has a weight-average molecular weight of from about 10,000 to 100,000.

7. An aromatic polycarbonate characterized by the general structural formula

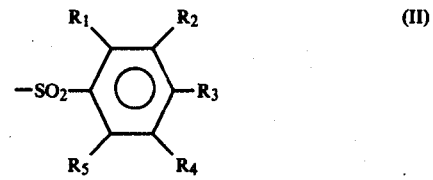

wherein

E and $E^1$ are the same or different and are radicals of the formula II

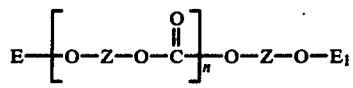

(II)

wherein $R_1$ to $R_5$ are identical or different and are H, $C_1$–$C_4$-alkyl, $C_5$–$C_6$-cycloalkyl, $C_6$–$C_{16}$- aryl or halogen, and wherein Z represents a divalent aromatic radical derived from a compound of the formula III

HO—Z—OH (III), and n is the degree of polymerization which results from a weight average molecular weight, Mw, of the aromatic polycarbonate of from about 10,000 to 100,000.

8. The aromatic polycarbonate of claim 7 wherein the aromatic sulfonyl radical of formula II is present in from about 2 to 20 mol % relative to the mols of divalent aromatic radical Z.

* * * * *